Patented Feb. 27, 1951

2,543,727

UNITED STATES PATENT OFFICE 2,543,727

MOISTURE SETTABLE PRINTING INK

Raymond F. Lecture, Chicago, Ill., and Allan T. Sedgwick, San Leandro, Calif., assignors to Interchemical Corporation, New York, N. Y., a corporation of Ohio No Drawing. Application September 6, 1947, Serial No. 772,592

9 Claims. (Cl. 106—27)

This invention relates to printing inks which have the characteristics of being settable by moisture and aims to provide an ink of this general character which has not only good printing properties and press stability, but has much better film properties than heretofore known inks.

The setting of inks by the application of moisture as a precipitant, disclosed in the Gessler patent U. S. 2,157,385, May 9, 1939, has resulted in considerable research being undertaken to provide inks which give satisfactory printing at high humidities, combined with rapid setting when exposed to moisture. The number of materials which are satisfactory are relatively few. In general, it has been found necessary to restrict the solvents to the polyglycols, and their water soluble monoethers. The number of resins which have been found useful have also been limited. They include the maleic modified rosin and terpene-phenol resins, and a limited number of other less common resins. In every case, however, the resins employed leave something to be desired by way of the type of film which is formed therefrom, so that tough prints such as are necessary for cartons and the like have not been produced in moisture setting vehicles.

We have discovered that moisture setting inks can be made which yield tough films that are sufficiently resistant to handling to be used on cartons and the like. Our new inks consist essentially of solutions of the reaction product of drying oils with a butendioic acid (such as maleic anhydride and fumaric acid), where sufficient of the modifying acid is reacted with the oil to produce a reaction product which is soluble in a polyglycol solvent. The upper limit of the amount of acid which may be reacted is the theoretical quantity which will react with the double bonds in oil, while the lower limit is 18.5%, based on the reactive double bonds of the drying oil. Even with the higher percentage of unsaturated acid the resultant product will still be unsaturated and will oxidize to give a tougher film than one can get with the resins now being used.

The amounts of acid that can be added to any given oil will vary, of course, with the degree of saturation of the oil and with the particular dibasic acid used. Thus, in using fumaric acid with linseed oil, a mixture of 73% of linseed oil and 27% of fumaric acid is necessary before solubility in diethylene glycol is approached. It is necessary to go up to a 70–30 mixture before one gets a resin which is freely soluble in diethylene glycol. The theoretical quantity of fumaric acid which can be reacted with linseed oil is 43%. This produces a hard resin.

With China-wood oil quite good solubility is obtained with a mixture of 72% oil and 28% fumaric acid; the theoretical quantity which can be used with wood oil is much higher than with linseed. A mixture of 45% wood oil and 55% fumaric acid gives a hard resin.

Where maleic anhydride is substituted for the fumaric acid similar results are obtained except that in the calculations the lower molecular weight of maleic anhydride must be taken into consideration so that one needs only about 85% as much of the anhydride as of the acid.

In addition to linseed oil and China-wood oil the other unsaturated oils can be used. Oiticica oil, dehydrated castor oil, walnut, saga, and the various other drying oils, both raw and bodied, can all be substituted.

The acid can be reacted with the oil and the mixture dissolved in the solvent. We find, however, that if the oil and acid are cooked together in the presence of the solvent (this in effect causes some esterification of the glycol and acid) somewhat higher solids contents are obtained. This means that a partial glycol ester of maleic anhydride oil is formed. We have found that while somewhat less stability to moisture results, satisfactory inks may yet be made.

TYPICAL EXAMPLES OF OUR INVENTION

An ink was prepared as follows:

*Example 1.—Parchment red*

45 parts by weight of a resin, prepared by reacting 75 parts by weight of raw China-wood oil and 28 parts by weight of fumaric acid at 425° F., are dissolved in 25 parts by weight of crude diethylene glycol. Into this varnish are ground 25 parts by weight of Saponaria red pigment and 5 parts by weight of liquid cobalt drier (3½% cobalt content) were then added.

One of the standard tests for parchment inks is immersion in boiling water. Conventional water setting inks will loosen immediately on boiling in water. This ink showed as good resistance to boiling water as conventional oil inks, rating with the very superior oil inks in this respect.

*Example 2.—Carton red*

60 parts by weight of a varnish were prepared by reacting 57 parts by weight of varnish grade linseed oil with 45 parts by weight of fumaric acid at 500° F. and dissolving the resin in an equal weight of crude diethylene glycol. Into this varnish were ground 25½ parts by weight of a lithol red. To this is added 4.3 parts by weight of the cobalt drier of Example 1, 1.7 parts by weight paraffin wax, and 8.5 parts by weight crude diethylene glycol.

Example 3.—Carton blue

A varnish is prepared by heating to 460° F. 640 parts China-wood oil with 120 parts maleic anhydride; after the resin is cooled below 400° F., 230 parts diethylene glycol is added as a solvent. This is made up into an ink of the following formula:

| | |
|---|---|
| Varnish | 160 |
| Diethylene glycol | 10 |
| Petrolatum wax (175° F. M. P.) | 4 |
| Iron blue | 35 |
| Methyl violet | 20 |
| Carbon black toner | 8 |
| Titanium white | 2 |
| Cobalt drier (3½% cobalt) | 5 |

Example 4.—Carton blue

Linseed oil, 900 parts is heated to 500° F. with 500 parts maleic anhydride; after cooling, 700 parts dipropylene glycol is added to provide a varnish for the following ink:

| | |
|---|---|
| Varnish | 200 |
| Diethylene glycol | 70 |
| Titanium white | 3 |
| Alkali blue | 38 |
| Carbon black toner | 15 |
| Purple toner (methyl violet lake) | 5 |
| Petrolatum, 175° F. M. P. | 13 |

Example 5.—Rub proof blue

China-wood oil, 640 parts is heated to 400° F. with 288 parts fumaric acid; after the reaction is finished and allowed to cool down below 300° F. diethylene glycol, 365 parts is added. This varnish is used in an ink as follows:

| | |
|---|---|
| Varnish | 200 |
| Diethylene glycol monoethylether | 70 |
| Titanium white | 3 |
| Red shade alkali blue | 38 |
| Petrolatum (175-185° F. M. P.) | 13 |
| Purple toner | 5 |

Obviously as indicated by the examples, the inks of our invention may be modified by the addition of most of the conventional additives used in the printing ink art to change the body, working properties, drying characteristics and so on.

We claim:

1. A moisture settable printing ink comprising a pigment dispersed in a vehicle comprising a highly acid unsaturated, and substantially unesterified reaction product of a butendioic acid and a drying oil, dissolved in a liquid, water-soluble solvent of the class consisting of diethylene glycol, dipropylene glycol and diethylene glycol monoethyl ether, and wherein the proportion of a butendioic acid to drying oil is within the limits of from 18.5 parts by weight of butendioic acid to 81.5 parts by weight drying oil up to substantially the theoretical amount of butendioic acid that will react with the double bonds of the drying oil.

2. Inks according to claim 1 where the acid is maleic acid.

3. Inks according to claim 1 where the solvent is dipropylene glycol.

4. A moisture settable printing ink comprising a pigment dispersed in a vehicle comprising a highly acid unsaturated, and substantially unesterified reaction product of a butendioic acid and linseed oil, dissolved in a liquid, water-soluble solvent of the class consisting of diethylene glycol, dipropylene glycol and diethylene glycol monoethyl ether, and wherein the proportion of butendioic acid to linseed oil is within the limits of from 27 parts by weight of butendioic acid to 73 parts by weight of linseed oil up to 43 parts by weight of a butendioic acid to 57 parts by weight of linseed oil.

5. A moisture settable printing ink comprising a pigment dispersed in a vehicle comprising a highly acid unsaturated, and substantially unesterified reaction product of fumaric acid and linseed oil, dissolved in a liquid, water-soluble solvent of the class consisting of diethylene glycol, dipropylene glycol and diethylene glycol monoethyl ether, and wherein the proportion of fumaric acid to linseed oil is within the limits of from 27 parts by weight of fumaric acid to 73 parts by weight of linseed oil up to 43 parts by weight of fumaric acid to 57 parts by weight of linseed oil.

6. Inks according to claim 5 where the solvent is diethylene glycol.

7. A moisture settable printing ink comprising a pigment dispersed in a vehicle comprising a highly acid unsaturated, and substantially unesterified reaction product of a butendioic acid and China-wood oil, dissolved in a liquid, water-soluble solvent of the class consisting of diethylene glycol, dipropylene glycol and diethylene glycol monoethyl ether, and wherein the proportion of butendioic acid to China-wood oil is within the limits of from 18.5 parts by weight of a butendioic acid to 81.5 parts by weight of China-wood oil up to substantially the theoretical amount of butendioic acid that will react with the double bonds of the China-wood oil.

8. Inks according to claim 7 where the acid is fumaric acid.

9. Inks according to claim 7, where the acid is fumaric and the solvent is diethylene glycol.

RAYMOND F. LECTURE.
ALLAN T. SEDGWICK.

REFERENCES CITED

The following references are of record in the file of this patent:

UNITED STATES PATENTS

| Number | Name | Date |
|---|---|---|
| 2,033,132 | Ellis | Mar. 10, 1936 |
| 2,185,080 | Haroldson | Dec. 26, 1939 |
| 2,365,363 | Swain | Dec. 19, 1944 |

FOREIGN PATENTS

| Number | Country | Date |
|---|---|---|
| 439,524 | Great Britain | Dec. 9, 1935 |